United States Patent [19]

Lachman et al.

[11] Patent Number: 4,633,918
[45] Date of Patent: Jan. 6, 1987

[54] COIL HANGER AND HANDLING METHOD

[75] Inventors: John C. Lachman, Charlevoix; Lewis B. Moorman, Lathrup Village; Alan A. Bosak, Howell, all of Mich.

[73] Assignee: Hoskins Manufacturing Company, Hamburg, Mich.

[21] Appl. No.: 684,011

[22] Filed: Dec. 20, 1984

[51] Int. Cl.⁴ .............................................. B21F 45/00
[52] U.S. Cl. .................................... 140/71 R; 29/611; 211/113; 211/94.5; 294/142; 294/143
[58] Field of Search ............... 294/137, 142, 143, 145, 294/148, 158, 159; 140/71 R; 211/94, 94.5, 113; 29/611

[56] References Cited

U.S. PATENT DOCUMENTS

| | | | |
|---|---|---|---|
| 654,684 | 7/1900 | Smith | 211/94 |
| 1,240,365 | 9/1917 | Plumb | 211/113 |
| 3,025,889 | 3/1962 | Clay | 140/71 R |
| 3,160,279 | 12/1964 | Hovey | 211/94 |
| 3,226,147 | 12/1965 | Marshall | 294/143 |
| 3,799,416 | 3/1974 | Schmaltz | 294/142 |

Primary Examiner—Francis S. Husar
Assistant Examiner—Robert Showalter
Attorney, Agent, or Firm—Barnes, Kisselle, Raisch, Choate, Whittemore & Hulbert

[57] ABSTRACT

This invention relates to material handling of helical coils of resistance heating wire, hangers for use in handling the wire coils, an assembly of hangers and coils and a method for handling such coils on hangers wherein the manufacture of resistance heating wire can wind and stretch the wire into a coil for a customer, form eyelets at both ends of the coil that are to be used as electrical contact terminals, and then assemble a plurality of coils side by side in a group with eyelets at each end of the coils being on a respective hanger. The hangers have a sleeve-like handle and an integral L-shaped rod arranged so that the coils can be mounted on the hanger by slipping the rod through the eyelets. The assembly of a pair of hangers and a group of coils can then be shipped as a unit to the customer where the customer need only remove the group of coils as a unit and mount the hangers on a T-shaped rack by slipping the handles over posts on the rack. The coils hang in loose loops so that they can be easily removed, usually one at a time, by the customer as they are used. The hangers may be configured to mount on customer racks upon which the customer would have previously hung the coils directly.

16 Claims, 6 Drawing Figures

COIL HANGER AND HANDLING METHOD

TECHNICAL FIELD

This invention relates to material handling of helical coils of resistance heating wire, hangers for use in handling the wire coils, an assembly of hangers and coils and a method for handling such coils on hangers wherein the manufacturer of resistance heating wire can wind and stretch the wire into a coil for a customer, form eyelets at both ends of the coil that are to be used as electrical contact terminals, and then assemble a plurality of coils side by side in a group with eyelets at each end of the coils being on a respective hanger. The hangers have a sleeve-like handle and an integral L-shaped rod arranged so that the coils can be mounted on the hanger by slipping the rod through the eyelets. The assembly of a pair of hangers and a group of coils can then be shipped as a unit to the customer where the customer need only remove the group of coils as a unit and mount the hangers on a T-shaped rack by slipping the handles over posts on the rack. The coils hang in loose loops so that they can be easily removed, usually one at a time, by the customer as they are used. The hangers may be configured to mount on customer racks upon which the customer would have previously hung the coils directly.

BACKGROUND

Resistance heating wire coils of the type, for example, that are used in electric clothes dryers have heretofore been fabricated and handled in various different ways. The resistance heating wire can be manufactured by one company and sold to a customer such as an appliance manufacturer who winds the wire, stretches it into a helical coil and forms eyelet terminals at opposite ends of the coil. This has some advantages because the wire can be shipped from the wire manufacturer to the customer using conventional wire packaging arrangements. It also enables the customer some flexibility in manufacturing coils to suit its demands on a current basis. However, the appliance manufacturer has to store and handle coils as a finished part and this requires some special handling to minimize tangling and nesting of the coils. Tangled or nested coils must be gently untangled to maintain the critical spacing, as manufactured, between adjacent convolutions. Rough handling can permanently distort the coil spacing which in turn will create problems in the finished product, for example, uneven heating in the case of heating coils.

One approach has been to hang the coils in a loop on a rack one at a time and in a fairly organized and untangled arrangement. Hanging long coils by both ends in a loop prevents sagging and permanent distortion. The eyelets at one end are slipped onto a post on the rack and the eyelets at the other end on another post spaced horizontally from the first post. This facilitates storage of the coils and handling thereof as they are removed, usually one at a time, for manufacturing the heating element of an electric clothes dryer or the like. Since this may be a production line operation, it is important that a worker be able to remove the coils efficiently from the rack without repeated interruption to untangle the coils.

It is frequently more economical for the wire manufacturer to fabricate the coils. Hence, a alternative approach is to have the wire manufacturer wind and stretch the wire into the finished coil and form the eyelet terminals. However, the wire manufacturer now has material handling problems to keep the coils from becoming nested and entangled and the customer still has material handling problems particularly for a production line operation.

SUMMARY OF THE INVENTION

The principal object of the present invention is to overcome, or at least minimize, the material handling problems encountered with helically wound and stretched resistance heating wire coils.

More particularly, an object of this invention is to provide efficient and effective material handling of such helical coils so that they can be fabricated by the wire manufacturer as a finished part at a low cost and a plurality of coils shipped as a unit to a customer who can then handle and store them as a unit and efficiently remove them from storage one at a time for use in an assembly operation.

A further object of the present invention is to provide a hanger particularly adapted for use in handling such helical coils wherein the hanger is of simple construction and consequently low in cost but yet rugged and dependable for repeated use.

DESCRIPTION OF THE DRAWINGS

The above objects and other features and advantages of the present invention will be apparent from the following detailed description, appended claims and accompanying drawings in which:

DETAILED DESCRIPTION OF THE DRAWINGS

Figure 1:
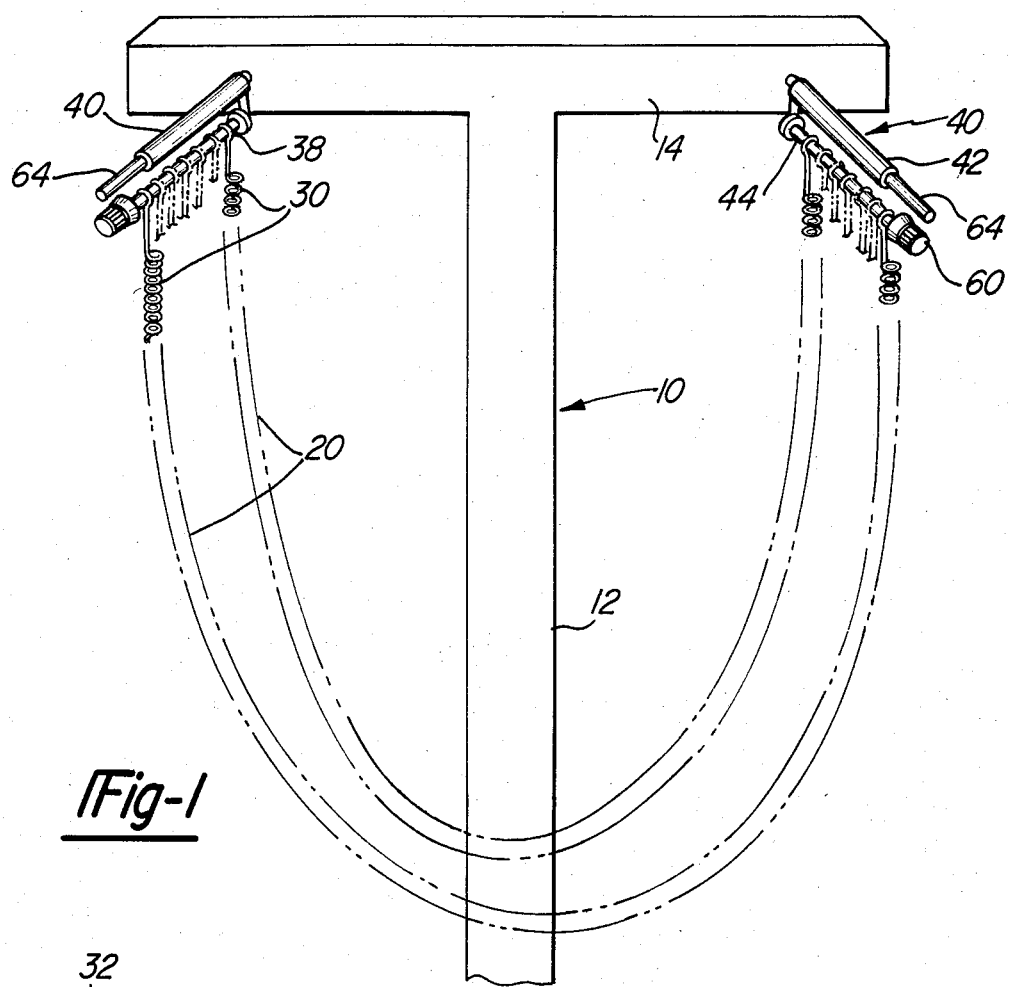
FIG. 1 is a front view of a T-shaped rack having a group of helical coils loaded on a pair of hangers and the hangers in turn mounted on the rack.
Figure 1A:
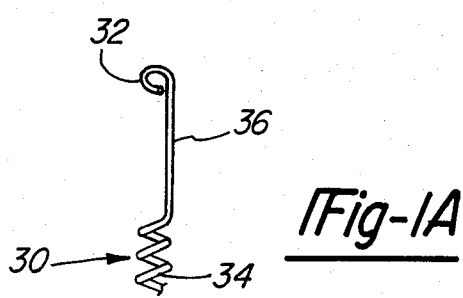
FIG. 1A shows the eyelet terminal at the end of a coil.

Referring now to the drawings, for purposes of illustration a T-shaped storage rack 10 is illustrated as having a vertical support 12 and an upper cross arm 14 having mounted thereon a group 20 of helically wound coils 30 of resistance heating wire. By way of example only, for heating coils used in electrical clothes dryers each coil group 20 might have twenty-five to thirty individual coils 30 each of which has an eyelet 32 at each end that is joined to a helical wound portion 34 by a short straight end portion 36. The overall length of an individual coil used for the heating element in an electrical clothes dryer might typically be on the order of eighty-five inches including the short end terminals that are used to make electrical connections. For the example being described, the resistance heating wire is a nickel chrome alloy wire, 16 gauge, with an outside diameter of the helix of about 0.344 inches. The helical portion 34 is like a very stiff spring that is generally self-supporting over a short run of a few inches but yet can be easily formed into the desired heater element configuration.

Figure 2:
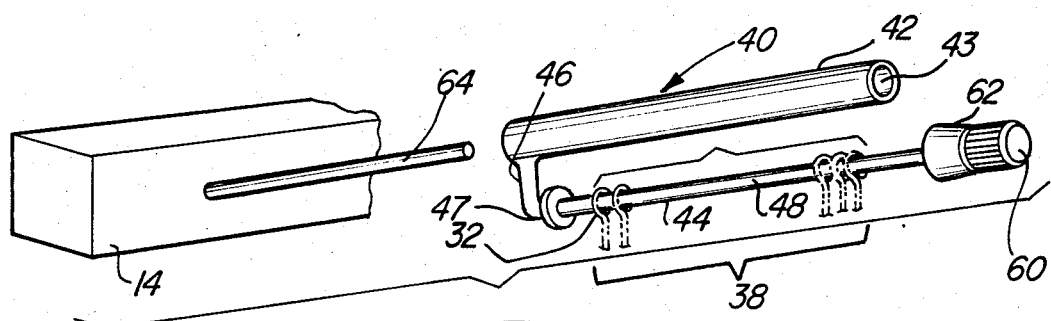
FIG. 2 is an exploded perspective view illustrating how the hanger is mounted on the rack.
Figure 3:
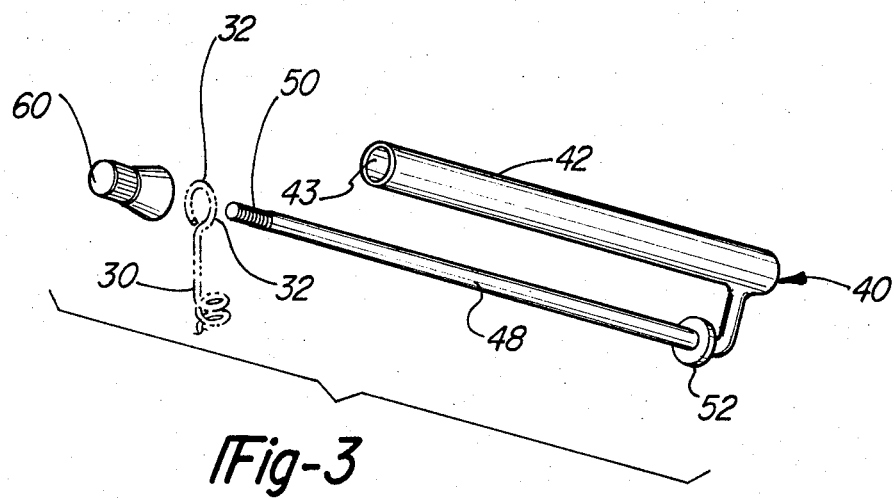
FIG. 3 is a further exploded perspective view of the hanger with a wire cap removed to illustrate how the coils are loaded and unloaded on the hanger.

Referring also to FIGS. 2 and 3, each end of coil group 20 (for example the left end 38 as viewed as FIG. 1) is assembled on a respective hanger 40 comprising a tubular sleeve portion 42 that serves as a handle and has a passageway 43 extending longitudinally therethrough. An L-shaped rod 44 has a short leg 46 fastened on the rear end of sleeve 42 and joined via elbow 47 to a long leg 48 which in turn extends forwardly of the hanger parallel to but spaced from sleeve 42. Rod leg 48 has a threaded free end 50 that projects outwardly beyond the sleeve and a radial flange 52 at its rear end adjacent elbow 47 that serves as a stop to prevent the coil eyelets 32 from sliding onto the short leg 46 when the coils are loaded on the hanger.

As shown schematically in FIGS. 2 and 3, a group of coils can be assembled on a hanger by slipping leg 48 through eyelets 32 and when a desired number of coils have been loaded onto the rod, they are retained thereon by a capped nut 60 threaded on end 50. Arm 14 has, at each opposite outer end, an elongated post 64 projecting forwardly and slightly upwardly. Each post 64 is adapted to receive and support a respective hanger 40 by slipping the post into the passageway 43 so as to hang the coils 30 looosely in loops.

In the preferred embodiment, nut 60 is a commercially available wiring nut made of plastic and having internal threads formed by a coil spring embedded therein. This type of wiring nut is commonly used to join together the bare wires of two or more insulated electrical wires, for example, in a junction or switch box. It is particularly suited for the present invention because it is can be replaced inexpensively and in the commercially available form it has a skirt 62 that pilots the nut onto the rod to facilitate a rapid assembly of the nut onto the rod by a worker. Skirt 62 also has a sufficiently large outside diameter to retain eyelets on rod 48.

By way of further illustration, with hangers 40 and the material handling technique utilizing the hangers of the present invention, a wire manufacturer can also fabricate the wire into helical coils 30 and form eyelets 32 at each end. A worker can then load a plurality of coils, for example twenty-five to thirty coils, onto a pair of hangers 40 by slipping the eyelets 32 at one end of each of coils onto the rod 48 of one hanger and then attach the wire nut 60. Similarly, the eyelets 32 at the other end of the coils are loaded on the second hanger 40. The coils can then be tied together by cords or other suitable fastening straps located at three or four places spaced axially along the coils. The coils assembled as a unit or group on a pair of hangers can then be packaged in a suitable container and shipped to the customer. Preferably the coils are rather loosely loaded onto a hanger to allow for some spacing therebetween or at least the eyelets are not packed on rods. A group of say twenty to thirty coils can be easily handled by a worker using the hangers as handles for the coil group, one handle for each hand. The coils can be shipped in commercially available containers used for wire products, for example an octagonal container of the type having an internal hub or reel.

When a customer receives the packaged coils, they can be easily removed from the shipping container in assembled groups as packaged by the wire manufacturer. Each unit or group is then hung on rack 10 by slipping the handles 42 onto respective posts 64 at opposite ends of arm 14 so that the coils hang in the loop configuration as shown in FIG. 1. The cords or bindings can then be removed from the coil group and nuts 60 removed from the hangers so that an assembly worker can unload coils as desired, usually one at a time, for production line manufacturing of a heater unit.

As indicated hereinabove, a rack 10 has been used heretofore commercially by customers of a wire manufacturer where the customer made its own helical coils and stored them one at a time by threading an individual eyelet 32 onto a post 40 so that the coil hangs directly on the post. According to an important aspect of the present invention, hangers 40 are usable with such racks currently used by the customer. Hence, sleeve 42 serves not only as a handle to facilitate handling of the coils as a group but it also serves to mount the coil group on the rack. Sleeve 42 is dimensioned so as to be easily grasped in a worker's hand when the coils are assembled on leg 48 and passage 43 is sufficiently large to slip easily over posts on the racks previously used by the customer. Although rack 10 has been illustrated as T-shaped, it will be apparent that racks of other configurations might be used, for example, to hold multiple groups of coils.

In one embodiment of the present invention handle 42 was about four and one-half inches long and slightly less than one-half inch in diameter. Although the size of hanger 40 could vary greatly depending upon the particular application, it is preferably dimensioned to facilitate the handling of a coil group by a single worker holding a hanger in each hand. Hanger 40 can be individually fabricated from a short length of steel tubing and a threaded steel rod brazed to the tubing. Flange 52 is a steel washer also brazed to the rod. Although the hanger can be manufactured individually for low volume production, the cost is sufficiently high to justify the customer returning hangers to the wire manufacturer. The steel construction is sufficiently rugged to allow for repeated re-use of the hangers. Although this rugged arrangement is preferred for relatively low volumes, it is within the scope of the present invention to mass produce the hangers as by injection molded plastic so that after one use the hangers could be thrown away.

Figure 4:
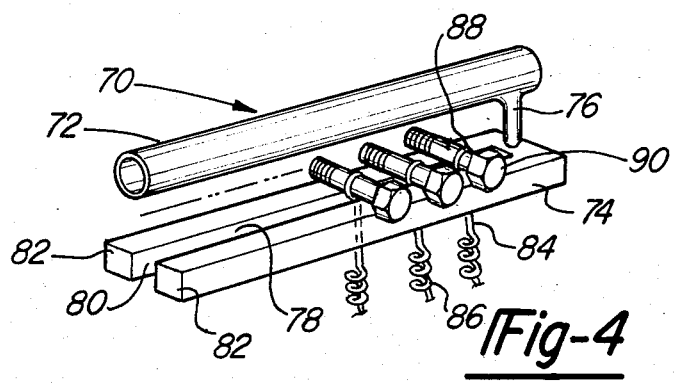
FIG. 4 is a perspective view of a different embodiment of a hanger of the present invention for coils having different terminals.

FIG. 4 shows a different embodiment of a hanger 70 having a tubular handle 72 and a flat slotted bar 72 fastened to the rear end of handle 72 by short integral leg 76 and extending forwardly of leg 76 parallel to and spaced from handle 72. Bar 72 has a slot 78 that is open at its forward end 80 to form a pair of fingers 82. The arrangement of slot 80 and fingers 82 is adapted to receive and carry the terminal end 84 of coils 86 that are formed with an eyelet or other end configuration 88 fastened on a terminal lug 90 as by soldering. For purpose of the present disclosure, except for the end portions 84, the coils 86 could be the same as the coils 30 (FIGS. 1-3) and a pair of hangers 70 are used in the same manner as hangers 40 to hang coils 86 on posts 64 on rack 10 (FIGS. 1 and 2). The open end 80 of slot 78 can be closed by suitable cap (not shown). The configuration of hanger 70 and the arrangement of terminal ends 84 on terminal lugs 90 illustrate how the present invention is usable with coil terminations other than the simple eyelet (FIGS. 1-3). Various other types of hanger configurations for other coil terminations will be readily apparent.

Figure 5:
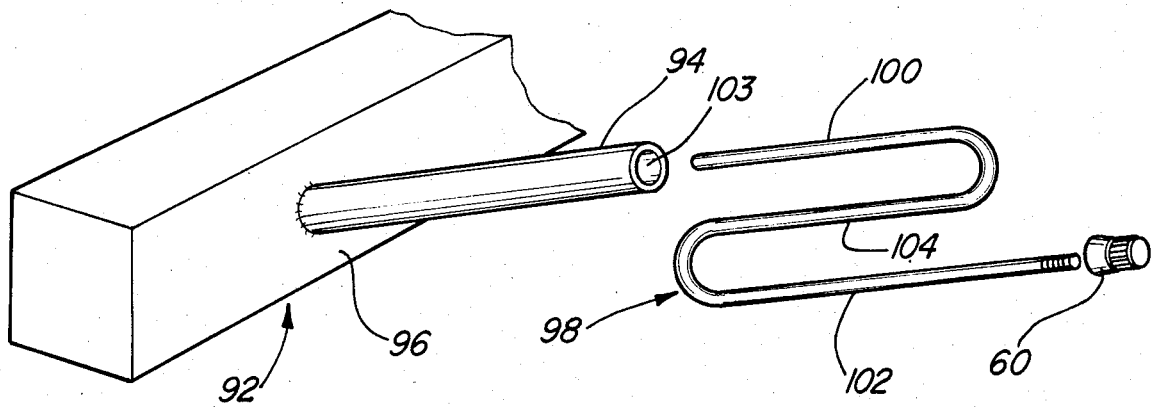
FIG. 5 is a perspective view of a further embodiment of the present invention where the hanger is a one-piece bent rod.

FIG. 5 shows a further embodiment of the present invention usable with a rack 92 which is like rack 10

(FIG. 1) except that a hollow tubular post 94 is mounted on each arm 96. An S-shaped hanger 98 is formed from a single piece of bent rod to form an upper leg 100 and a lower leg 102 joined together by the returned bent intermediate leg 104. Leg 102 is dimensioined to receive coil eyelets, in the manner that leg 48 receives eyelets 32 on coils 30 in FIGS. 1–3, which are retained on leg 102 by threaded cap 60. Leg 100 serves as a handle, like sleeve 42 (FIGS. 1–3), and is dimensioned to fit into a passageway 103 in post 94 to mount the coils (not shown) on rack 92 in substantially the same manner that coils 30 are mounted on rack 10 (FIGS. 1–3).

From the foregoing description, it should be apparent that the present invention provides a technique for handling coils of resistance heating wire so as to keep the coils loosely assembled in a group until a coil is ready to be used. This material handling technique minimizes nesting and tangling of the coils which in turn reduces the likelihood of rough handling by a worker. It also facilitates efficient loading of coils onto a storage rack as a group rather than one at a time. Although the material handling technique was developed particularly for helical coils of resistance heating wire, it is potentially useful in other material handling applications where the material requires special handling between the time that it is manufactured and subsequently used.

It will be understood that the technique for handling helical coils of resistance heating wire, the hangers for use in handling the wire coils and the assembly of the coils on a pair of hangers have been described hereinabove for purposes of illustration and are not intended to indicate the limits of the present invention, the scope of which is defined by the following claims.

We claim:

1. The method of handling a plurality of helical coils of resistance heating wire or the like wherein said plurality of coils are to be stored as a group for use in a manufacturing operation comprising manufacturing, a plurality of helical coils with a terminal at each end thereof, assembling at a first location all of said terminals at one of said ends of said coils on a first hanger, transporting the coils assembled as a group on said first hanger to a second location remote from said first location, storing said plurality of coils as a group by mounting said first hanger on a rack, and then removing said coils from said first hanger on said rack as required for a manufacturing operation at said second location.

2. The method set forth in claim 1 further comprising assembling all of said terminals at the other ends of said coils on a second hanger and wherein said coils are transported as a group while they are mounted on said first and said second hangers, said coils are stored as a group by mounting said first and said second hangers at respective locations on said rack spaced apart horizontally from each other so that said coils hang in loops between said hangers and said coils are removed as required from both said first and said second hangers.

3. The method set forth in claim 2 wherein each of said hangers has a handle portion and a coil carrying portion, said coils are assembled on said carrying portions, said coils are handled manually by a worker using said handle portions on respective hangers in respective hands and hangers are mounted on said rack by hanging the handle portions on the rack.

4. The method set forth in claim 2 wherein said rack has a pair of posts thereon spaced apart horizontally from each other, said hangers each have a tubular portion and said hangers are mounted on the rack by slipping a tubular portion onto a post.

5. The method set forth in claim 4 wherein said end terminals are in the form of eyelets, said hangers include a rod-like portion having a free end and said terminals are assembled on said hangers by threading said eyelets onto the rod-like hanger portions.

6. The method set forth in claim 2 wherein said end terminals are in the form of eyelets, said hangers include a rod-like portion having a free end and said terminals are assembled on said hangers by threading said eyelets onto the rod-like hanger portions.

7. The method set forth in claim 2 wherein said rack has a pair of tubular posts thereon spaced apart horizontally from each other, said hangers each have a rod-like portion having a free end and said hangers are mounted on said rack by slipping said rod-like portions into said tubular posts.

8. The method of handling a plurality of helical coils of resistance heating wire or the like wherein said plurality of coils are to be stored as a group for use in a manufacturing operation substantially one at a time comprising manufacturing a plurality of helical coils with an eyelet at each end thereof, assembling all of said eyelets at one end of said coils on a rod-like portion of a first hanger which also has an integral apertured handle portion, assembling all of said eyelets at the other end of coils on a rod-like portion of a second hanger which also has an integral apertured handle portion, transporting the coils assembled as a group on the first and the second hangers to a second location geographically remote from said first location, temporarily storing said plurality of coils by inserting said handles onto respective posts of a storage rack, said posts being spaced apart horizontally from each so that said coils hang in a loop therebetween, and then removing said coils substantially one at a time from said rack as required for a manufacturing operation at said second location.

9. A material handling combination for use with helical coils of resistance heating wire or the like comprising a rack having a pair of mounting means thereon spaced apart horizontally from each other, a pair of coil hangers each of which has mounting means thereon arranged and constructed to cooperate with said rack mounting means to mount said hangers on said rack with said hangers spaced apart horizontally, and a plurality of said helical coils having end portions at one coil end carried on one hanger and end portions at the other coil end carried on the other hanger so that the coils hang in loops on said rack.

10. The combination set forth in claim 9 wherein one of said rack mounting means and said hanger mounting means is a post and the other mounting means is apertured to fit onto said post.

11. The combination set forth in claim 10 wherein said coil end portions are eyelets threaded on rod-like members on said hangers.

12. The combination set forth in claim 11 wherein said mounting means on said rack are posts and said mounting means on said hangers are tubular sleeves dimensioned to slip onto said posts.

13. In combination a hanger and a group of individual helically wound coils of resistance heating wire or the like assembled on said hanger wherein each of said coils has an eyelet terminal at one end, said hanger being adapted to facilitate handling of said individual coils as a group and comprising an apertured member whose aperture is dimensioned to slide onto a post and a rod-like member integral with said apertured member and dimensioned so that said eyelets can clip over the rod-like member and retainer means on said hanger releasable retaining the eyelets on the rod like member until the retainer means is released and wherein said helical coils of resistance heating wire have eyelets at each end, the eyelets at one end being assembled on said rod-like member of said hanger and wherein said combination further comprises a second hanger like said first mentioned hanger and wherein the eyelets at the other ends of each coil are assembled on the rod-like member of the second hanger so that the coils can be handled as a group and hung in a loop by slipping the apertured member on one hanger over one post and the apertured member on the other hanger on another post spaced horizontally from said one post.

14. The combination as set forth in claim 13 wherein said apertured member of said hangers further comprises a handle having an aperture therethrough dimensioned to slide onto a post on a support, said rod-like member is fastened to said handle so as to extend generally parallel to an axis of said aperture with a free end of said rod-like member being disposed such that eyelets can be slipped onto such rod-like member, said rod-like member passing through said eyelets to mount said coil ends on said hanger, and said retainer means is releasably fastened on said free end, said retainer means having a transverse cross section greater than said eyelets to inhibit removal of said eyelets from said rod-like member.

15. The combination as set forth in claim 14 wherein said apertured handle of each hanger comprises a tubular sleeve having a longitudinal passageway therethrough and said rod-like member of each hanger comprises an L-shaped rod having a short leg fastened at one end to one end of said sleeve and a long leg extending from the other end of said short leg substantially parallel to said passageway in spaced relation to said sleeve and projecting beyond the outer end of said sleeve so as to be accessible to receive eyelets when they are slipped onto said long leg and slid therealong in the space between said sleeve and said long arm.

16. The method of handling a plurality of helical coils of resistance heating wire or the like wherein said plurality of coils are to be shipped to a remote location for use in a subsequent manufacturing operation comprising manufacturing a plurality of helical coils with a terminal at each end thereof, assembling at a location other than said remote location all of said terminals at one of said ends of said coils on a first hanger and then assembling all of said terminals at the other ends of said coils on a second hanger so that a plurality of coils can be transported as a group while they are mounted on said first and said second hangers to said remote location for use in said subsequent manufacturing operation.

* * * * *